United States Patent Office 2,847,261
Patented Aug. 12, 1958

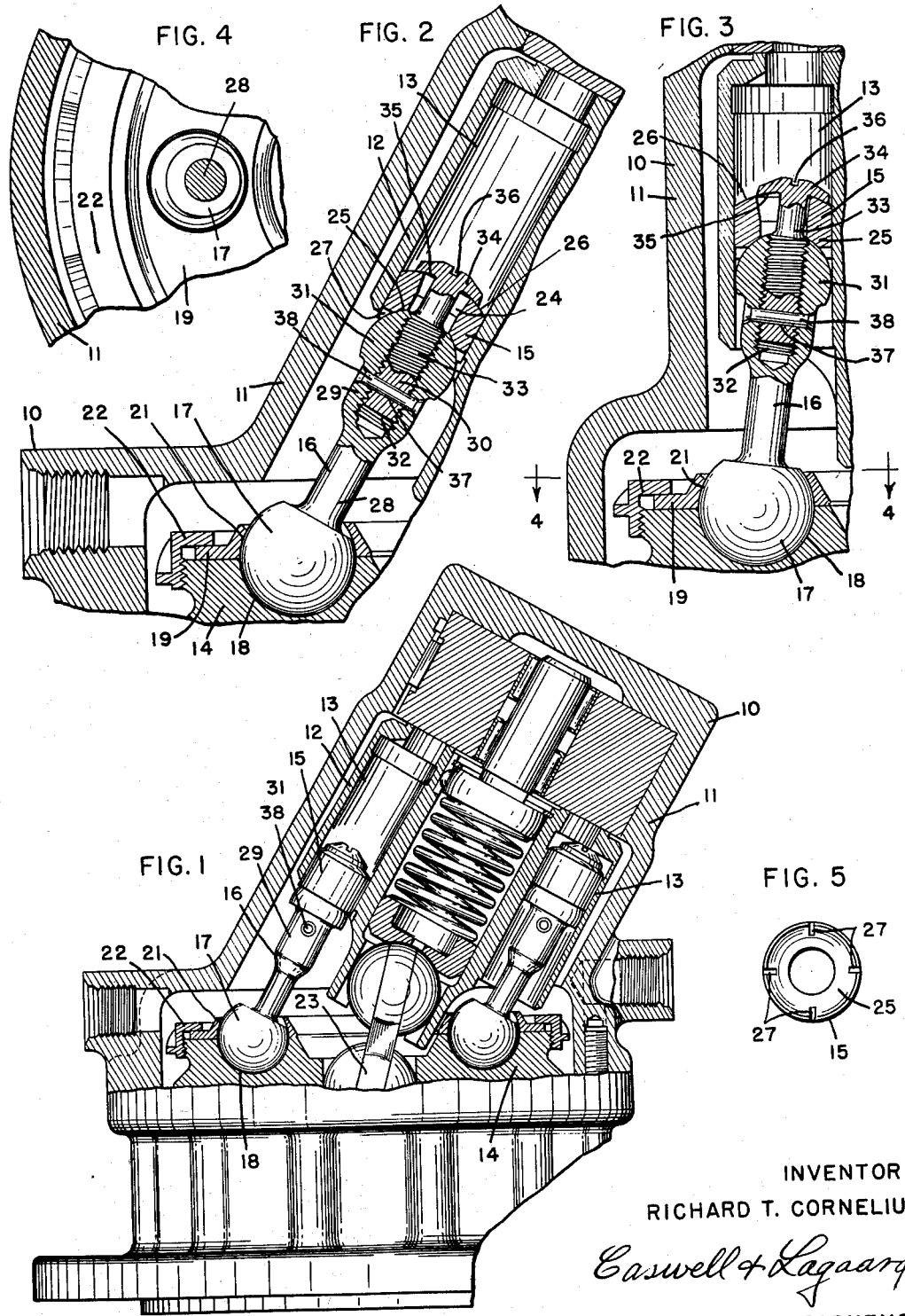

2,847,261

PISTON CONSTRUCTION

Richard T. Cornelius, Minneapolis, Minn.

Application July 19, 1956, Serial No. 598,790

6 Claims. (Cl. 309—20)

The herein disclosed invention relates to piston construction and particularly to the structure for transmitting the load on the piston to the connecting rod.

An object of the invention resides in providing a construction in which the unit pressure on the coacting surfaces of the piston and connecting rod is a minimum.

Another object of the invention resides in providing a ball and socket connection between the piston and connecting rod and in which the diameter of the ball is substantially equal to the diameter of the piston.

A still further object of the invention resides in forming the ball on the connecting rod and the socket in one end of the piston and in providing means acting between the connecting rod and the other end of the piston for retaining the ball within the socket.

A feature of the invention resides in providing the piston with a hole extending axially therethrough and in further providing an elongated shank extending through said hole and connected at one end to said connecting rod, and a head on the end of said shank engaging said piston and holding the ball within said socket.

Other objects of the invention reside in the novel combination and arrangement of parts and in the details of construction hereinafter illustrated and/or described.

In the drawings:

Fig. 1 is a fragmentary elevational-sectional view of a hydraulic motor illustrating an embodiment of the invention applied thereto.

Fig. 2 is a view similar to Fig. 1 of a portion of the structure disclosed therein and with portions thereof shown in section.

Fig. 3 is a view similar to Fig. 2 illustrating one of the pistons ninety degrees away from the piston shown in Fig. 2.

Fig. 4 is a fragmentary plan sectional view taken on line 4—4 of Fig. 3.

Fig. 5 is an inverted view of the piston with the connecting rod detached therefrom.

For the purpose of illustrating the application of the invention, a portion of a hydraulic motor 10 has been shown. This motor comprises a case 11 in which is rotatably mounted a cylinder block 12 and in which is formed a number of longitudinally extending cylinder bores 13 arranged in the form of a circle about the axis of rotation of said cylinder block. Also disposed within the case 11 is a rotor 14 which serves as the driven element of the motor and which is rotatably supported within the case 11 for rotation about an axis which intersects the axis of the cylinder block 12 and makes an angle with respect thereto.

Slidable in the cylinders 13 are pistons 15 which have connected to them connecting rods 16. These connecting rods are provided at their outer ends with balls 17 and which fit into sockets 18 formed in the upper portion of the rotor 14. A retainer ring 19 has depressions 21 formed in it and which engage the balls 17 and hold the same in the sockets 18. This retainer ring is held in position by means of a clamp ring 22 screwed on the rotor 14. The cylinder block 12 and the rotor 14 are driven in unison by means of a universal joint 23 acting therebetween.

Due to the fact that the invention may be used with various different kinds of motors, the motor has neither been illustrated or described in detail, though it will be readily comprehended that the motor has the usual valving and a drive connection between the rotor thereof and such other parts as are necessary to the operation of the same.

The invention proper resides in the piston construction which includes the piston 15 and the structure for connecting the connecting rod 16 thereto. These parts have been illustrated in detail in Figs. 2 and 3.

The piston 15 is tubular in form and has a hole 24 extending axially thereof. At the outer end of the piston a spherical socket 25 is formed and at the inner end a spherical convex surface 26 is formed whose center coincides with the center of the socket 25. The center of these surfaces lies in the axis of the piston 15 and outwardly of the same. Across the outer end of the piston 15 is formed a number of transverse radial slots 27 which project through the outer marginal portion of the piston but which fall short of the opening 24. These slots provide lubricating channels for conducting oil to the contacting surfaces of the connecting rod and piston as subsequently will become readily apparent.

The connecting rod 16 is formed with a shank 28 and on which the ball 17 is mounted. This shank has an enlargement 29 at the other end thereof and on which is mounted another ball 31. The ball 31 has the same curvature as the socket 25 of piston 15 and its center substantially coincides with the center of said socket. The ball 31 and the enlargement 29 are formed with a threaded axially extending hole 32 and in which is screwed a screw 33. Screw 33 has a threaded shank 30 which enters the hole 32 and a head 34 which is formed with a concave undersurface 35 of the same curvature as the surface 26 of piston 15. The ball 31 is of substantially the same diameter as the piston 15 and fits snugly within the cylinder bore 13. The head 34 is formed with a screwdriver slot 36 and by means of which the same can be adjusted to provide the desired clearance between said head and the surface 26. After the parts have been properly assembled, a hole 37 is drilled through the enlargement 29 and the end of screw 33 and a rivet 38 inserted in this hole and riveted in position to hold the parts properly assembled. The head 34 of screw 33 holds the ball 31 in the socket 25 and permits swinging movement of the connecting rod 16 with reference to piston 15 to the position shown in Fig. 3.

In operation the piston travels in the cylinder bore 13 in the customary manner with the connecting rod swinging with reference thereto as shown in Figs. 2 and 3.

The advantages of the invention are manifest. The bearing area of the ball on the connecting rod and on the piston is considerably greater than where the piston is formed with a lip which extends over the ball and holds the same in position, thus the unit pressure on the coacting surfaces is greatly reduced as compared with the conventional type of piston. Lubrication of the surfaces at the thrust resisting portions of the same can also be more readily accomplished than where the ball is more enclosed. The piston and connecting rod may rotate relative to the cylinder so that wear on the parts is equally distributed.

Changes in the specific form of the invention, as herein described, may be made within the scope of what is claimed without departing from the spirit of the invention.

Having described the invention, what is claimed as new and desired to be protected by Letters Patent is:

1. A piston construction comprising an annular piston having an axially disposed hole therethrough, an elongated connecting rod for cooperation with said piston having a longitudinal axis and being constructed at the end thereof adjacent said piston with a portion formed with a convex spherical surface whose center is contained in the axis of said connecting rod, said piston having a spherical socket at its outer end engaging said spherical surface, said portion being formed with a tapped hole extending through the inner end thereof and coaxially disposed relative to the axis of said connecting rod, a screw formed with a threaded shank screwed into the tapped hole in the connecting rod, the inner end of said piston having a convex spherical surface concentric with the spherical surface of said connecting rod and said screw having a concave spherical surface engaging the convex spherical surface of said piston, the shank of said screw fitting loosely in the hole in said piston to accommodate angular swinging movement of said connecting rod relative to said piston, and means for holding said screw from rotation.

2. A piston construction comprising an annular piston having an axially disposed hole therethrough, an elongated connecting rod for cooperation with said piston having a longitudinal axis and being constructed at the end thereof adjacent said piston with a ball formed with a convex spherical surface whose center is contained in the axis of said connecting rod, said piston having a spherical socket at its outer end engaging said spherical surface, said ball being formed with a tapped hole extending through the inner end thereof and coaxially disposed relative to the axis of said connecting rod, a screw formed with a threaded shank screwed into the tapped hole in the connecting rod, the inner end of said piston having a convex spherical surface concentric with the spherical surface of said connecting rod and said screw having a concave spherical surface engaging the convex spherical surface of said piston, the shank of said screw fitting loosely in the hole in said piston to accommodate angular swinging movement of said connecting rod relative to said piston, and means for holding said screw from rotation.

3. A piston construction comprising an annular piston having an axially disposed hole therethrough, an elongated connecting rod for cooperation with said piston having a longitudinal axis and being constructed at the end thereof adjacent said piston with a ball formed with a convex spherical surface whose center is contained in the axis of said connecting rod, said ball being of substantially the same diameter as said piston, said piston having a spherical socket at its outer end engaging said spherical surface, said ball being formed with a tapped hole extending through the inner end thereof and coaxially disposed relative to the axis of said connecting rod, a screw formed with a threaded shank screwed into the tapped hole in the connecting rod, the inner end of said piston having a convex spherical surface concentric with the spherical surface of said connecting rod and said screw having a concave spherical surface engaging the convex spherical surface of said piston, the shank of said screw fitting loosely in the hole in said piston to accommodate angular swinging movement of said connecting rod relative to said piston, and means for holding said screw from rotation.

4. A piston construction comprising an annular piston having an axially disposed hole therethrough, an elongated connecting rod for cooperation with said piston having a longitudinal axis and being constructed at the end thereof adjacent said piston with a portion formed with a convex spherical surface whose center is contained in the axis of said connecting rod, and within the confines of said connecting rod between said surface and the end thereof opposite said piston, said piston having an outwardly facing spherical socket at its outer end engaging said spherical surface, and retaining means extending through the piston acting between the other end of said piston and said connecting rod and retaining the spherical surface of said connecting rod in engagement with said spherical socket.

5. A piston construction comprising an annular piston having an axially disposed hole therethrough, an elongated connecting rod for cooperation with said piston having a longitudinal axis and being constructed at the end thereof adjacent said piston with a ball formed with a convex spherical surface whose center is contained in the axis of said connecting rod, said ball being of substantially the same diameter as said piston, said piston having a spherical socket at its outer end engaging said spherical surface, and retaining means acting between the other end of said piston and said connecting rod and retaining said ball within said socket.

6. A piston construction comprising an annular piston having an axially disposed hole therethrough, an elongated connecting rod for cooperation with said piston having a longitudinal axis and being constructed at the end thereof adjacent said piston with a portion formed with a convex spherical surface whose center is contained in the axis of said connecting rod, said piston having a spherical socket at its outer end engaging said spherical surface, said piston being formed with a convex spherical surface at its other end and means engaging the convex spherical surface of said piston and connected to said connecting rod and movable along said convex spherical surface of the piston to guide said connecting rod for angular swinging movement relative to said piston and to retain the convex spherical surface of said connecting rod in engagement with the spherical surface of said piston.

References Cited in the file of this patent

UNITED STATES PATENTS

| | | |
|---|---|---|
| 1,499,964 | Bell | July 1, 1924 |
| 2,297,649 | Donaldson | Sept. 29, 1942 |